United States Patent
Larson et al.

[15] 3,679,051
[45] July 25, 1972

[54] IMPROVED METAL AND PLASTIC CHIP WRINGING APPARATUS AND PROCESS

[72] Inventors: Charles R. Larson, Bellevue; Robert H. Dudley, Portage, both of Mich.

[73] Assignee: Prab Conveyors, Inc., Kalamazoo, Mich.

[22] Filed: Feb. 26, 1970

[21] Appl. No.: 14,313

[52] U.S. Cl..................................210/73, 210/74, 210/124, 210/128, 210/138, 210/197, 210/259, 210/512
[51] Int. Cl.........................................................B01d 21/26
[58] Field of Search............................210/73, 84, 259–262, 210/195–197, 512 M, 124, 128, 138

[56] References Cited

UNITED STATES PATENTS

| | | | |
|---|---|---|---|
| 2,754,968 | 7/1956 | Vegter et al. | 210/73 |
| 3,407,934 | 10/1968 | Ejefors | 210/73 |
| 3,392,114 | 7/1968 | Delcellier | 210/73 X |
| 3,456,798 | 7/1969 | Urdanoff | 210/73 |

Primary Examiner—John Adee
Attorney—Gordon W. Hueschen and Talivaldis Cepuritis

[57] ABSTRACT

Cutting and cooling fluids used in machining metal and/or plastic parts are effectively removed from the resulting chips by a process comprising first separating in a centrifugal separator a liquid-slid admixture of the fluid and chips into a solids portion and a liquid portion containing entrained solid particles, thereafter introducing the liquid portion into a cyclone separator so as to concentrate the solid particles in a liquid bottoms portion, and reintroducing the solid particle-containing liquid bottoms portion into the centrifugal separator. The liquid takeoff portion from the cyclone separator is substantially free from solid particles and can be reused. The apparatus comprises a centrifugal separator and a cyclone separator suitably interconnected to effect the desired transfers of the fluids.

6 Claims, 1 Drawing Figure

Patented July 25, 1972
3,679,051
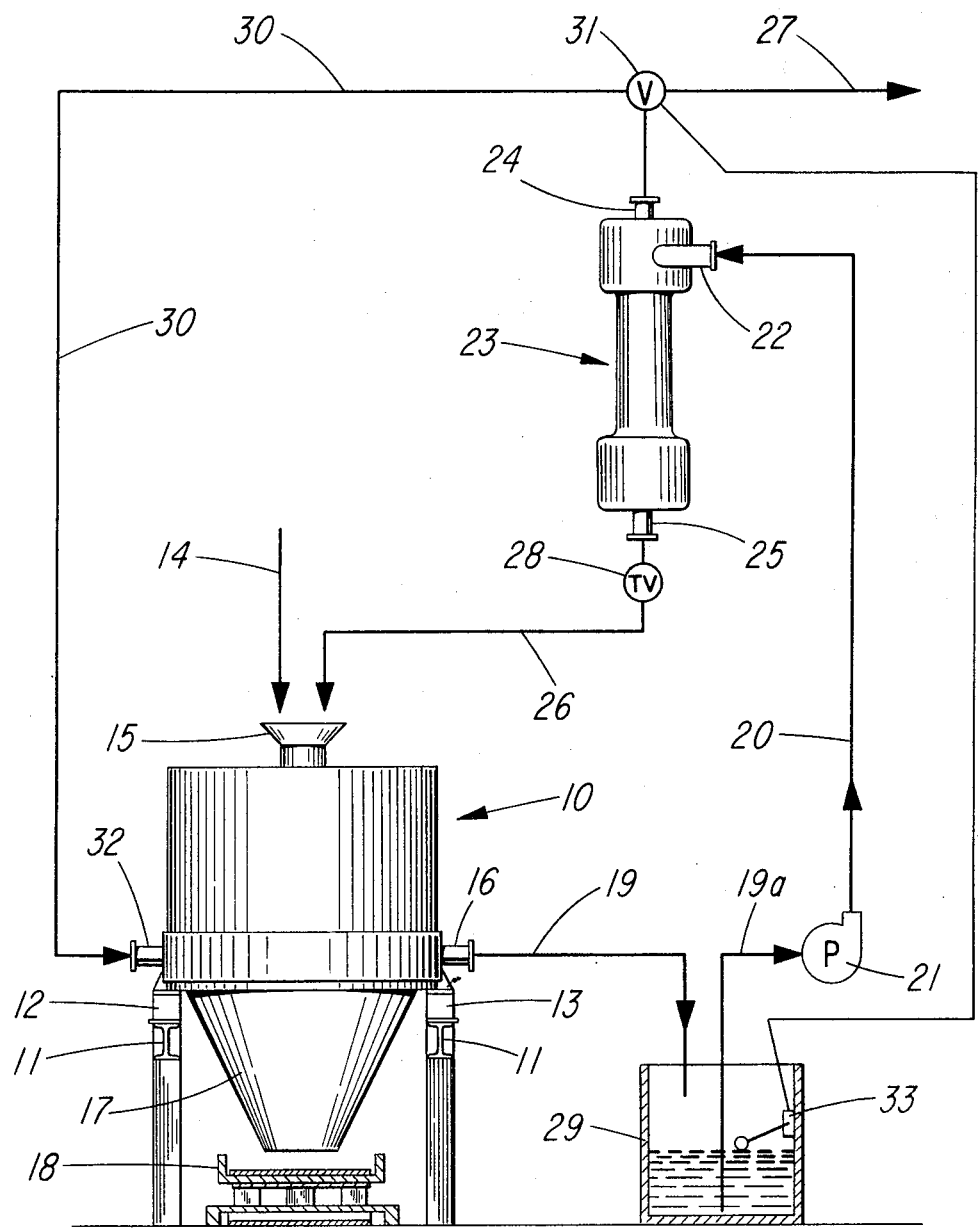
INVENTORS
CHARLES R. LARSON
ROBERT H. DUDLEY
BY
ATTORNEY

3,679,051

IMPROVED METAL AND PLASTIC CHIP WRINGING APPARATUS AND PROCESS

BACKGROUND OF THE INVENTION

Metal or plastic chips are generally produced during manufacturing processes on machines such as turret lathes, milling machines, drills, gear hobbers, boring mills, grinding wheels, and the like. In most instances cutting and/or cooling fluids are utilized during the aforementioned machining operations. Both the cutting or cooling fluids and the chips possess a substantial reclamation value.

It is known to recover such chips and used cutting or cooling fluids by centrifugation; however, in instances where the produced chips are very fine or of relatively low specific gravity, substantial amounts of solids remain entrained in the fluids even after centrifugation. Moreover, even relatively coarse chips become comminuted to some extent during handling and centrifuging. Thus, not only a loss of valuable metal or plastic scrap is suffered, but also the reuse applications of the recovered cutting or cooling fluids is severely limited.

It is an object of the present invention to provide apparatus and process whereby the chips and the cutting or cooling fluids can be effectively and economically reclaimed.

It is a further object to provide apparatus and process whereby scrap material recovery is increased and substantially dry scrap metal or plastic is obtained.

Still other objects will readily become apparent to the skilled artisan upon reference to the ensuing specification, the drawing, and the claims.

SUMMARY OF THE INVENTION

Liquids are recovered from a liquid-solid admixture by first introducing the admixture into a centrifugal separator and isolating a solids portion and a liquid portion containing entrained solid particles therefrom. The liquid portion is thereafter transported to a cyclone separator wherein the entrained solid particles are concentrated in a liquid bottoms portion and a substantially solids-free liquid portion is withdrawn and is suitable for reuse. The liquid bottoms portion is reintroduced into the centrifugal separator and the concentrated solids recovered by centrifugation together with the liquid-solid admixture feed.

The apparatus of this invention comprises a combination of a centrifugal separator and a cyclone separator interconnected so that the liquid portion reclaimed from a centrifugal separator is subsequently introduced into a cyclone separator which is adapted to concentrate entrained solid particles and to reintroduce such particles into the centrifugal separator.

BRIEF DESCRIPTION OF THE DRAWING

In the drawing, the FIGURE is a schematic representation of a centrifuge-cyclone combination suitable for the practice of this invention.

DESCRIPTION OF THE PREFERRED EMBODIMENTS

Referring to the FIGURE, a centrifugal separator 10, supported on a suitable frame 11 by means of vibration-dampening suspensions 12 and 13 is adapted to receive a liquid-solid admixture feed by means of line 14 through admixture inlet 15. Centrifugal separator 10 is further provided with a liquids discharge outlet 16 and a solids discharge outlet or hopper 17 through which recovered solid metal or plastic materials such as chips and fines are deposited on a conveyor means 18, or a suitable vessel or container, and transported away.

A liquid isolated in centrifugal separator 10 contains entrained solid particles or fines and is transported by means of confined flow passageways or lines 19, 19a and 20 and a suitable pump 21, if necessary, to liquid feed inlet 22 of cyclone separator 23 which is also provided with a takeoff outlet 24 and a bottoms outlet 25. Communication between the cyclone separator 23 and admixture inlet 15 of centrifugal separator 10 is effected by a confined flow passageway or pipe 26 which returns liquid bottoms containing concentrated solid particles to centrifugal separator 10. Substantially solid particle-free cooling or cutting fluid is drawn off through takeoff outlet 24 and carried away for subsequent use or to storage by means of pipe 27. One such use of the solid particle-free fluid is in preventing the buildup of fines within the liquid gathering and liquid conveying portions of separator 10 which can ultimately clog the liquid outlets thereof thus necessitating a shutdown. To this end a portion of the fluid drawn off through takeoff outlet 24 is recirculated back to separator 10 through liquid inlet 32 via return pipe 30 which is controlled by a three-way valve 31 at the junction of pipes 27 and 30. When the incidence of fines is high and the probability of clogging substantial, most if not all of the fluid drawn off through outlet 24 is recirculated.

In such instances and when relatively large liquid effluent volumes are encountered, a sump tank 29 is connected between separator 10 and cyclone separator 23. The sump tank 29 is provided with a level sensing means 33, such as a float-actuated sensor, which can be adapted to regulate the action of three-way valve 31. That is, when the liquid level in tank 29 exceeds a predetermined level, a lesser portion of the recovered fluid is recirculated and a greater portion of the fluid is taken to storage.

Sizing of the sump tank 29 is not critical. When a relatively small tank is utilized, the fluid velocity in tank 29 is sufficiently high to prevent the settling of any fines therein; however, when a relatively large tank is used and the fluid velocity is relatively low, some fines will settle out in tank 29 and have to be periodically cleaned out.

In some instances, particularly when the entrained solid particle content of the liquid effluent is not very high, for example, about 0.1 percent by volume or less, it is desirable to feed the liquid bottoms from cyclone separator 23 to centrifuge separator 10 intermittently. In such instances a timer valve 28 can be installed in line 26 and opened manually or automatically by any suitable means, such as hydraulic or air pressure, at the desired intervals.

In operating the aforedescribed apparatus of the present invention, a liquid-solid admixture, usually containing up to about 90 percent by weight solids in the form of chips and fines is introduced into centrifugal separator 10 from feed line 14. The introduced admixture is isolated by centrifugation into two portions — a solids portion containing chips and fines and a liquid portion having entrained solid particles or fines. After the aforesaid isolation, the solids are conveniently discharged through hopper 17 and the liquid portion is transported to cyclone separator 23 wherein the entrained solids are concentrated in a liquid bottoms portion and returned to centrifugal separator 10. The volume ratio of solids in the liquid bottoms portion to solids in the centrifuge effluent is greater than 1:1, and preferably about 10:1, or greater. It has been found that the solid particles, or fines, in such concentrations, when centrifuged together with the relatively larger chips are effectively retained by the chips and can be recovered as solids with the attendant reclamation of a substantially solids-free fluid. Thus dual benefits of higher solids recovery and a greater yield of reusable cutting or cooling fluid are obtained. An additional benefit is the elimination of centrifuge clogging by the fine solid particles.

In order to optimize the recovery and reclamation process a relatively high solids concentration, in the liquid bottoms effluent from cyclone separator 23 is desirable. To this end, even though the entire process can be continuous, the liquid bottoms return can be intermittent or continual by suitably sizing the capacity of cyclone separator 23 and by timing the operation of timer valve 28. The liquid bottoms are then held in the cyclone separator 23 until the desired solids concentration is reached and then released.

A further advantage that can be gained by intermittent operation is that the centrifuge separator 10 can be operated at varying liquid-solid admixture feed rates without affecting the overall process efficiency. By a process of this invention a moisture content in the discharged solids as low as 2 weight percent, or lower, is readily attainable.

We claim:

1. A continuous process for recovering a liquid from a liquid-solid admixture which comprises the steps of
   - introducing the admixture into a centrifugal separator and isolating therefrom by centrifugal action a solids portion and a liquid portion having solid particles entrained therein;
   - discharging said solids portion;
   - transporting said liquid portion to a cyclone separator and removing entrained solid particles therefrom thereby producing a liquid takeoff portion substantially free of entrained solid particles and a liquid bottoms portion; and
   - returning said bottoms portion intermittently through a timer valve to said centrifugal separator.

2. The process in accordance with claim 1 wherein the isolated solids portion has a liquid content not greater than about 2 percent by weight.

3. The process in accordance with claim 1 wherein the solids content in the bottoms portion is greater than the solids content in said liquid portion.

4. The process in accordance with claim 1 wherein at least a portion of the liquid takeoff portion is recirculated to the centrifugal separator.

5. Apparatus for recovering a liquid from a liquid-solid admixture comprising in combination:
   - centrifugal separator means provided with an admixture inlet, a solids discharge outlet, and a liquid discharge outlet;
   - cyclone separator means provided with a liquid feed inlet, a takeoff outlet, and a bottom outlet;
   - a confined flow passageway providing communication between said liquid discharge outlet and said liquid feed outlet;
   - a second confined flow passageway providing communication between said bottoms outlet and said admixture inlet; and
   - a timer valve operably situated in said second confined flow passageway.

6. Apparatus for recovering a liquid from a liquid-solid admixture comprising in combination:
   - centrifugal separator means provided with an admixture inlet, a solids discharge outlet, a liquid inlet and a liquid discharge outlet;
   - cyclone separator means provided with a liquid feed inlet, a takeoff outlet, and a bottoms outlet;
   - a confined flow passageway providing communication between said liquid discharge outlet and said liquid feed outlet;
   - a second confined flow passageway providing communication between said bottoms outlet and said admixture inlet;
   - a third confined flow passageway providing communication between said liquid inlet and said cyclone separator takeoff outlet for returning liquid from said cyclone separator to said centrifugal separator;
   - a sump tank operably connected into said confined flow passageway between said liquid discharge outlet and said liquid feed inlet;
   - a three-way valve operably situated in said third confined flow passageway for controlling the amount of liquid returned to said centrifugal separator; and
   - a liquid level sensing means provided in said sump tank for regulating the action of said three-way valve controlling liquid input into said centrifugal separator.

* * * * *